No. 806,498. PATENTED DEC. 5, 1905.
B. A. RHOADES.
DEVICE FOR OILING VEHICLE AXLES.
APPLICATION FILED NOV. 18, 1903.
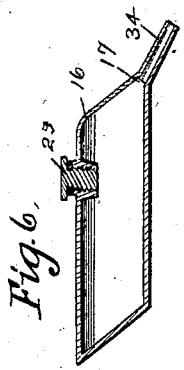
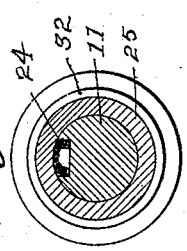
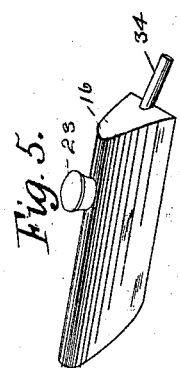
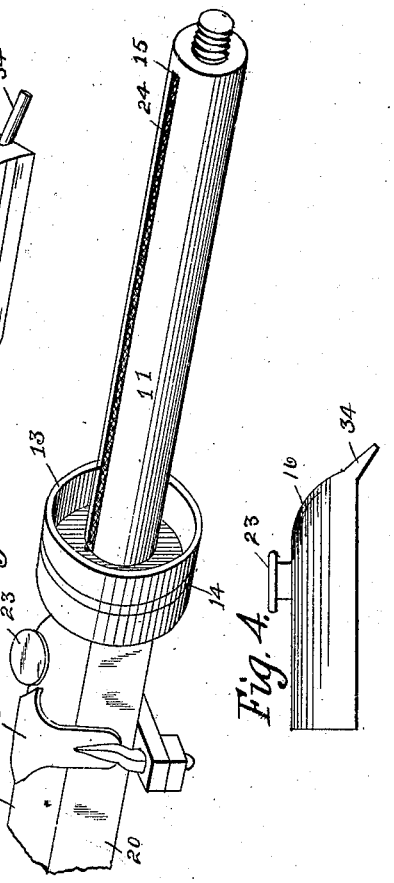
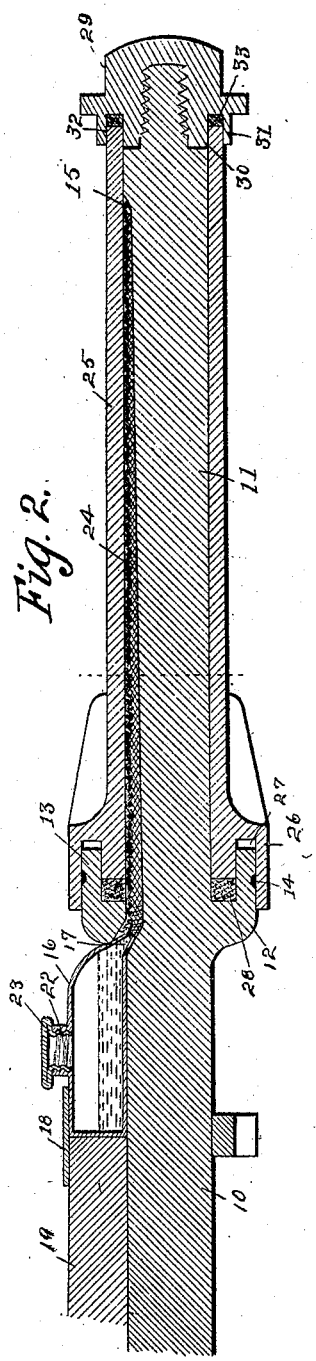
Witnesses
A. G. Heague
S. F. Christy
Inventor B. A. Rhoades
By Orwig & Lane Att'ys

UNITED STATES PATENT OFFICE.

BENJIMAN ALLEN RHOADES, OF MARSHALLTOWN, IOWA.

DEVICE FOR OILING VEHICLE-AXLES.

No. 806,498.          Specification of Letters Patent.          Patented Dec. 5, 1905.

Application filed November 18, 1903. Serial No. 181,602.

*To all whom it may concern:*

Be it known that I, BENJIMAN ALLEN RHOADES, a citizen of the United States, residing at Marshalltown, in the county of Marshall and State of Iowa, have invented certain new and useful Improvements in Devices for Oiling Vehicle-Axles, of which the following is a specification.

The objects of my invention are to provide an oiling device for vehicle-axles which can be easily and readily attached to or detached from the ordinary vehicle-axle and which is very compact in size and is so arranged and shaped that it will not easily be detected on the axle of a vehicle, as a portion of the axle is removed and the detachable oiling device placed in the position which was occupied by the removed portion and which is of substantially the same size and shape as said portion.

A further object is to provide a longitudinal groove in the spindle of the axle extending beneath the sand-guard on the axle and to a point adjacent to the outer and lower end of the detachable oil-reservoir, and, further, to provide a reservoir which may be easily filled and refilled without removing the wheel from the axle, and, further, to provide a sand-box which will prevent the sand from getting into the space between the spindle of the axle and the interior of the hub, and also to provide a nut which will prevent the oil which is around the spindle of the axle from flowing outwardly, and thus prevent the exterior of the nut from getting greasy.

The invention consists in certain novel constructions and combination of parts, as hereinafter described, and pointed out in the claim.

In the drawings, Figure 1 shows in perspective the oiling device in position on the axle of the vehicle to which it is attached. The wheel is removed to show the sand-guard. Fig. 2 is a longitudinal section view of a portion of the vehicle-axle, showing the oiling device in position thereon and also showing the sleeve which fits over the spindle of the axle, which is usually mounted on the interior of the hub of the wheel. Fig. 3 is a sectional view of the axle and sleeve cut on the line 3 3 of Fig. 2, and Fig. 4 is a detail sectional view of a reservoir detached from the axle. Fig. 5 is a perspective view of a modified form of the oil-reservoir, and Fig. 6 is a longitudinal sectional view of the modified form of the oil-reservoir removed from its position on the vehicle-axle.

Referring to the accompanying drawings, I have used the reference-numeral 10 to indicate an axle provided with a spindle 11 at its outer end. Forming a portion of the axle at the rear of the spindle 11 and encircling it is a sand-guard 12, having the outwardly-projecting flange 13 thereon and having the groove 14 encircling the outer circumference of the flange. In the upper periphery of the spindle I have provided a longitudinal groove 15, which extends through and to the rear of the sand-guard 12. Detachably mounted on the upper portion of the axle and inside of the sand-guard is a reservoir 16, having a flat lower portion which is designed to rest against the upper surface of the axle, a rounded upper portion, and an opening 17 through its forward lower end leading into the inner end of the longitudinal groove 15.

The reference-numeral 18 represents the ordinary clip, which is customarily used on the axle of a vehicle to maintain the wooden portion 19 of the axle to the metal portion 20 thereof. In attaching the reservoir 16 to the axle the clamp 18 is removed from its position on the axle and a portion of the wooden part of the axle is cut away to form a space between the outer end of the wooden portion and the inner end of the sand-guard 12. When this portion is removed, the reservoir 16 is placed in the position on the metal part 20 of the axle which was occupied by the wooden portion which has been removed. The clamp 18 is again placed in position, so that a portion of it will engage the wooden part 19 of the axle and a portion of the clamp will engage the inner upper surface of the oil-reservoir, and inasmuch as the forward lower end of the reservoir rests against the portion 21 of the sand-guard the reservoir will be held firmly in position relative to the axle.

In the upper surface of the reservoir I have provided an opening 22 with a screw-threaded cap 23, mounted therein and so arranged that it can be easily removed. This opening is to afford easy access to the interior of the reservoir, so that by simply removing the cap 23 the reservoir may be easily refilled. Extending from the opening 17 in the lower outer end of the reservoir 16 and lying in the groove 15 is a wick 24, which is designed to convey the oil from the reservoir throughout the entire length of the groove 15, and thus keep the spindle constantly oiled when the sleeve 25 is rotated thereon. Thus the spindle will be constantly oiled so long as the reservoir 16 contains a lubricant.

By providing a flange 13 to the sand-guard 12 a circular groove is formed between this flange and the spindle 11. This would necessitate the providing of a flange 26 for the rear end of the sleeve 25, so as to form a circular groove 27 between the outer surface of the rear end of the sleeve 25 and the inner surface of the flange 26 to admit the flange of the sand-guard. A washer 28 is placed at the rear of the groove which is formed by the flange 13, and the inner end of the sleeve 25 is designed to rest against said washer, and the flange 13 is designed to enter the groove 27, and said flange will extend over a portion of the sand-guard outside of the groove 14 in said sand-guard. Thus the dust or dirt which is collected as the vehicle travels will be lodged in the sand-groove 14 and will be prevented from getting into the other parts of the axle. The nut 29 has the flanges 30 and 31 at its inner end designed to form the circular groove 32 to admit the outer end of the sleeve 25. A washer 33 is usually placed in said groove for the outer end of the sleeve 25 to rest against. By the use of this nut it is clearly obvious that the oil will be very largely prevented from getting on the exterior of said nut, and thus prevent clots of grease from forming on the exterior of said nut.

In the modified form of the device I have shown in Figs. 5 and 6 the rear portion of the reservoir inclined and the forward portion correspondingly inclined, and a small tube 34 leads from the front of the reservoir into the rear of the groove 15. This provides a reservoir which will be more easily maintained in position relative to the axle and if detached from the axle will leave it in good condition for use without the oiling device. It is to be understood in this connection with the use of my device that any of the ordinary sand-guards may be used and any of the ordinary nuts which are commonly in use on vehicle-axles for maintaining the wheel in position thereon may be used, the form which I have shown being simply a form of device which is more practical in the use of it than any which I am informed about.

In practical operation and after the device has been attached to the ordinary axle the wheel is never designed to be removed from the axle except to clean it at infrequent intervals, the oiling of the device being accomplished by simply removing the cap 23 and filling the reservoir. A very material advantage in the use of this device over the ordinary method of oiling vehicles is that the reservoir will contain a larger amount of oil than can be ordinarily placed upon the ordinary axle and can much more easily be refilled than the axle which is in common use can be oiled by removing the wheel.

Having thus described my invention, what I claim, and desire to secure by Letters Patent of the United States therefor, is—

A device of the class described, comprising a vehicle-axle having a longitudinal groove in its spindle, an oil-reservoir mounted on and forming a portion of the axle and designed to engage the inner portion of the axle, a clamp for maintaining the oil-reservoir in position relative to the axle and for holding the wooden portion of the axle to the iron portion thereof, a sand-guard having a hollow interior and a groove encircling it, designed to maintain in position the outer end of the oil-reservoir, a wick leading through the sand-guard into the reservoir, the flange which forms the sides of the opening on the interior of the sand-guard designed to enter a groove in the boxing of the wheel to be placed on the axle, and a nut having a groove encircling its inner portion designed to receive the outer end of the boxing in the wheel placed upon the axle.

BENJIMAN ALLEN RHOADES.

Witnesses:
 RAY R. EAST,
 G. SCHMELZ.